United States Patent [19]

Lagatta

[11] Patent Number: 5,713,119
[45] Date of Patent: Feb. 3, 1998

[54] TRANSMISSION ASSEMBLY TOOL

[76] Inventor: Richard Lagatta, 393 Engle Dr., Tucker, Ga. 30084

[21] Appl. No.: 497,606

[22] Filed: Jun. 30, 1995

[51] Int. Cl.$^6$ ...................................................... H01R 9/00
[52] U.S. Cl. ............................................... 29/464; 29/468
[58] Field of Search ............................. 29/434, 464, 468, 29/469

[56] References Cited

U.S. PATENT DOCUMENTS

| | | | |
|---|---|---|---|
| 4,443,922 | 4/1984 | Deland | 29/254 |
| 4,656,715 | 4/1987 | Diaz | 29/259 |
| 4,864,709 | 9/1989 | Klucz et al. | 29/259 |
| 4,982,488 | 1/1991 | Ragsdale, Sr. | 29/263 |
| 5,165,156 | 11/1992 | Shultz | 29/275 |

OTHER PUBLICATIONS

AXOD Automatic Overdrive Transaxle—Disassembly and Assembly (Revised) 1986; Ford Parts and Service Div. Training and Publications Department.

*Primary Examiner*—P. W. Echols
*Assistant Examiner*—Adrian L. Coley
*Attorney, Agent, or Firm*—Isaf, Vaughan & Kerr

[57] ABSTRACT

A tool for installing the planetary assembly and reverse clutch assembly of an automatic transmission as a combined assembly therein. The tool includes an elongated tubular handle extending along a longitudinal axis having a first end and an opposed second end. A grip assembly is formed at the first end of the handle. The grip assembly has a handle extension fastened to the first end of the handle and extending away from the handle along the longitudinal axis, and a pair of spaced fingers positioned at the free end of the handle extension, the fingers being spaced about the longitudinal axis of the tool and extending in a direction transverse to the length of the tool. The fingers of the tool are adapted to engage a groove defined in the hub of the front planetary assembly so that the combined reverse clutch assembly and planetary assembly can be simultaneously installed in the automatic transmission of an automobile.

6 Claims, 2 Drawing Sheets

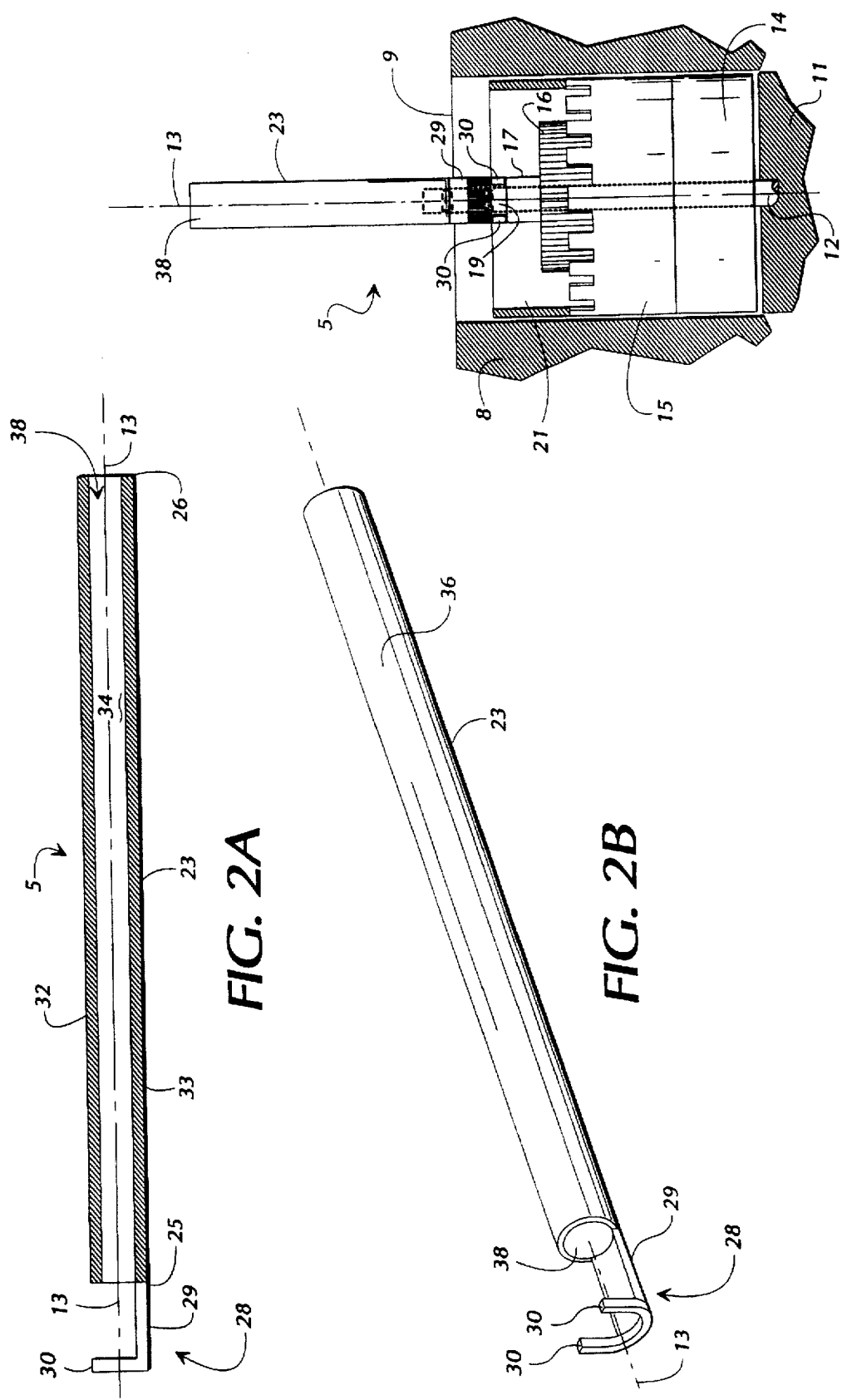

TRANSMISSION ASSEMBLY TOOL

FIELD OF THE INVENTION

This invention relates in general to assembly tools for automatic motor vehicle transmissions. More particularly, this invention relates to a transmission assembly tool for use in simultaneously installing the planetary assembly and reverse clutch assembly of the transmission within its case assembly.

BACKGROUND OF THE INVENTION

Automatic transmissions are well known in the art, having been used in motor vehicles for a number of years. Although automatic transmissions have greatly simplified the task of driving the motor vehicle, the typical automatic transmission is itself a very complicated device which includes a number of parts operated through hydraulic pressure and mechanical force. The automatic transmission has attained a large degree of acceptance, however, because of its ability to continuously adapt the output of the engine to the desired speed and load conditions of the motor vehicle in which the transmission is installed. The resultant effect of the process, however, is the inevitable wear of the transmission, requiring repair and/or replacement of parts within the transmission.

Modern automatic transmissions include a number of sub-assemblies, all of which are designed to fit closely within or in relation to each other. The result of automatic transmission design, however, has been that these sub-assemblies are often in very close tolerances with respect to one another, and are oftentimes fit together closely within the confines of a case assembly forming a part of the automatic transmission.

The invention here is concerned with a tool which can be used in assembling automatic transmissions in which a differential assembly is situated within a case assembly, the differential assembly having a differential output shaft extending along a longitudinal axis and projecting partially out of the case assembly. A lower-intermediate rear sun gear and drum assembly is fit over the differential output shaft and passed into the case assembly so that it rests upon the differential assembly. Thereafter, a planetary assembly, the planetary assembly including front and rear planet assemblies, is fit over the differential output shaft and passed down into engagement with the rear sun gear assembly. Thereafter, a reverse clutch assembly is passed over the differential output shaft and is fit on top of the planetary assembly. None of these transmission components are new in the art, and it is not with these components that this invention is concerned.

Rather, this invention provides an improved tool and method for simultaneously installing the reverse clutch assembly and the planetary assembly of a Ford AXOD or AXODE automatic transmission within the case assembly of the transmission, or transaxle, the repair work typically being done on a bench or holding fixture.

A number of hand tools have been developed in the art for use in assisting in the assembly or disassembly of automatic transmission components. One example of these tools is shown in the patent to Deland U.S. Pat. No. 4,443,922, issued Apr. 24, 1984. Deland discloses a tool for extracting an object from an assembled arrangement, citing as an example a low and reverse gear clutch housing from a planetary gear arrangement. The tool of Deland has an outer cylindrical hollow member and an inner cylindrical hollow member arranged in telescoping fashion so that the outer cylindrical member is telescopingly movable relative to the inner cylindrical member. Elongated legs extend from the outer surface of the outer cylinder over the outer surface of the inner cylinder, each leg being made of a flexible material including a cam at its free end adapted to extract an object having a central circular opening from an assembled arrangement. Accordingly, although the tool of Deland appears to be well suited for removing a reverse gear clutch assembly from an automatic transmission, the tool of Deland is not designed nor intended to be used in assembling the planetary assembly and reverse gear clutch assembly, together, within the case assembly of the transmission.

Another example of a transmission tool known in the art is shown in U.S. Pat. No. 5,165,156 to Schultz, issued Nov. 24, 1992. Schultz discloses a tool for installing or removing a clutch drum piston assembly from the planetary gear assembly of an automatic transmission. This is accomplished by a tool having a sliding handle arrangement and an adjustable spindle adapted to be used with clutch drum assemblies of various diameter central apertures. The adjustable spindle is formed from a plurality of elongated arcuate members radially disposed about a disc intermediate the ends of the arcuate members defining a fulcrum. An adjustment collar is disposed on one end of the elongated arcuate members, and as the adjustment collar is moved axially towards the opposite end of the tool, the tapered inner surface of the adjustment collar causes the arcuate members to pivot radially outward about the fulcrum, thus engaging the periphery of the aperture defined by the clutch housing assembly. Schultz does not disclose a tool which can install the planetary assembly and the reverse clutch assembly of an automatic transmission simultaneously within the case assembly of the transmission, however.

Still another example of a transmission tool is found in the patent to Diaz, U.S. Pat. No. 4,656,715, issued Apr. 14, 1987. Like the tool to Deland, the tool of Diaz is intended for use in the removal or installation of a clutch housing from the transmission case of a vehicle automatic transmission. The tool of Diaz has a first assembly and a second assembly, the first assembly being used to remove or replace the clutch housing of a GMC Turbo Hydromatic transmission series 325 transmission. The tubular housing of the first assembly is inserted into an opening in the front of the clutch housing, and the housing tightened by expanding the end of the housing with an expansion sleeve, whereupon the sleeve expands when pulled inwardly by the rotation of a compression means so that the clutch housing is removed by applying pressure to a threaded shaft that pushes against the transmission output shaft and releases the clutch housing. The second assembly of the tool to Diaz is used in combination with the first assembly to hold and center the output shaft at the rear of the transmission case during the removal of the clutch housing for a GMC series 200 Turbo Hydromatic transmission. Like the tools of Deland and Schultz, the tool of Diaz is not intended nor designed to be used in simultaneously installing the reverse clutch assembly and planetary assembly of the automatic transmission within its case assembly.

None of the prior art known to the inventor discloses or illustrates a transmission assembly tool designed and constructed to be used for simultaneously installing the reverse clutch assembly and planetary assembly of an automatic transmission, including the Ford AXOD or AXODE automatic transmissions, within the case assembly of the transmission. Moreover, none of the prior art known to the inventor discloses a simple tool which will not require the adjustment of collars, sleeves, or portions of tubular housings to fit or attach the tool to the components of the transmission for use in assembling and disassembling the component sub-assemblies of the transmission. Thus, the need exists for an improved yet simple tool adapted to carry out the installation of the planetary assembly and reverse clutch assembly together within the case assembly of an automatic transmission or transaxle.

SUMMARY OF THE INVENTION

The present invention provides an improved transmission assembly tool which overcomes some of the design deficiencies of the other transmission tools known in the art by providing a simple, one piece transmission assembly tool which does not require adjustment of the tool for the purposes of adapting the tool to the task at hand, and by providing a unique transmission assembly tool which is designed to allow an automobile mechanic to simultaneously install the reverse clutch assembly and planetary gear assembly of a Ford AXOD or AXODE automatic transmission within the case assembly of the transmission, whether the transmission is positioned on a workbench, or installed in a motor vehicle supported overhead on a vehicle lift.

The transmission assembly tool described herein has an elongated tubular handle formed along a longitudinal axis, the handle having a first end and a second end. A handle extension is formed at the first end of the handle and extends away therefrom along the axis of the tool. A grip means is provided at the end of the handle extension, which includes a pair of spaced fingers positioned generally parallel to one another, and sized and shaped to grip the planetary gear assembly of the transmission therebetween, the spaced fingers extending transversely with respect to the longitudinal axis of the transmission assembly tool. An interior passageway is defined within the handle of the transmission tool and extends therethrough along the axis of the tool. The interior passageway is sized and shaped so that the differential output shaft of the automatic transmission may be passed therethrough. The transmission assembly tool of this invention can be of any conventional tubular configuration, and thus can either be square, rectangular, or circular in cross section if so desired.

The transmission assembly tool of this invention also provides an improved method of assembling a Ford AXOD or AXODE automatic transmission. This new method includes the steps of gripping the planetary assembly of the transmission with the tool, after the reverse clutch assembly has been positioned on the planetary assembly, and then simultaneously installing both the planetary assembly and reverse clutch assembly within the case assembly of the transmission.

Thus, it is an object of the invention to provide an improved transmission assembly tool which is simple in construction and is adapted for use with automatic transmissions.

Another object of the invention is to provide an improved transmission assembly tool which can be used to simplify the of an automatic transmission.

Still another object of the present invention is to reduce the number of steps involved in assembling an automatic transmission assembly, thus saving time and maximizing the effort of automobile mechanics.

Yet another object of the invention is to provide an improved transmission assembly tool which can be used to pre-assemble certain of the components of an automatic transmission prior to installation thereof within the transmission.

Another object of the invention is to provide an improved transmission tool which can be used for installing the reverse clutch assembly and planetary assemblies within an automatic transmission with greater precision than in doing so by hand.

It is also an object of the invention to provide an improved transmission assembly tool which is simple in design, is inexpensive to construct, is durable and rigid in structure, and is easy to use.

These and other objects, features, and advantages of the invention will become apparent upon reading the specification when taken in conjunction with the accompanying drawings.

BRIEF DESCRIPTION OF THE DRAWINGS

FIG. 2A is a cutaway side elevational view of a preferred embodiment of the transmission assembly tool.

FIG. 2B is a perspective view of an alternate embodiment of the transmission assembly tool.

FIG. 3 is a cutaway side elevational view through a portion of an automatic transmission case assembly illustrating the use of the transmission assembly tool.

DETAILED DESCRIPTION

Figure 1:
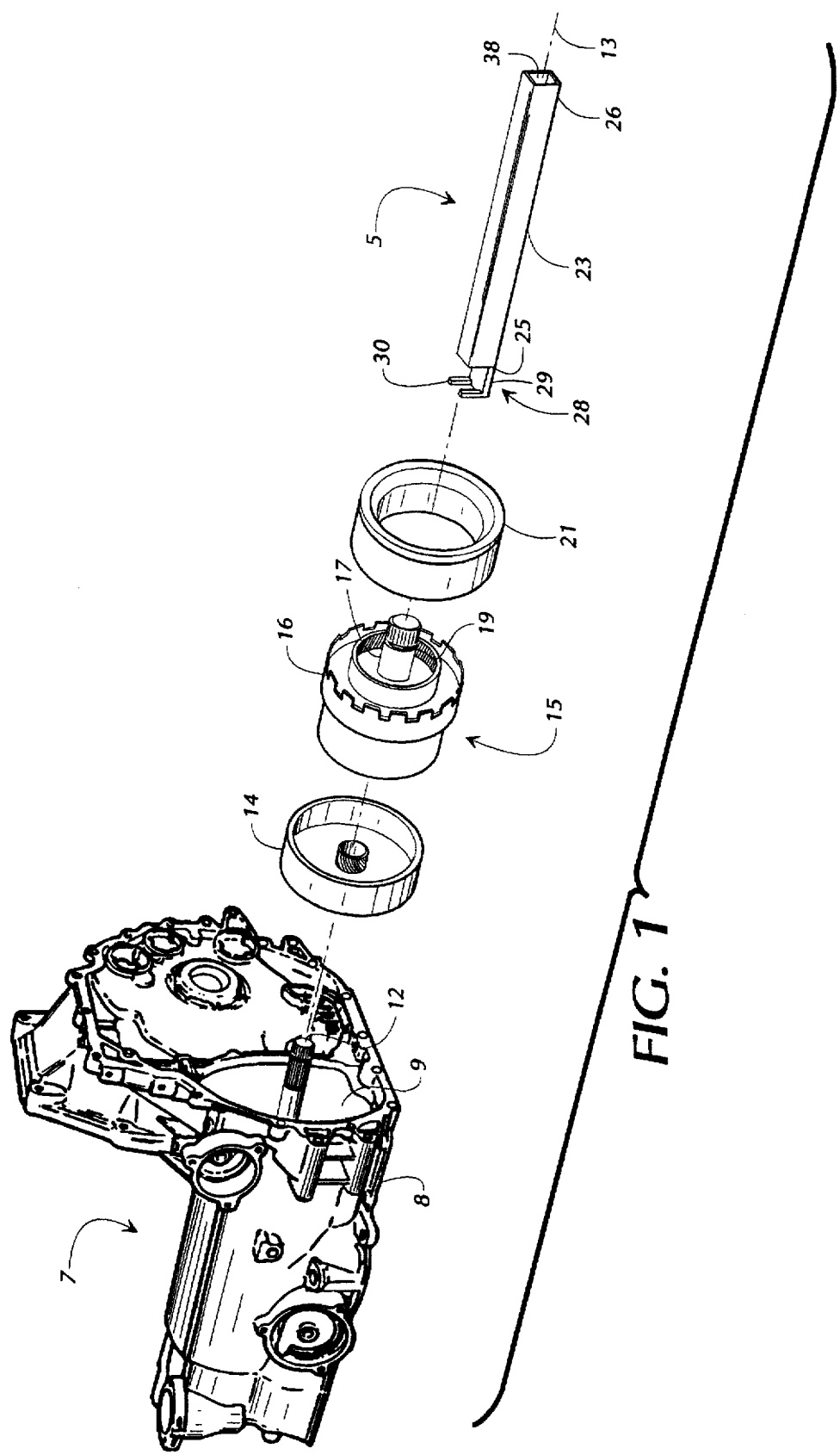
FIG. 1 is an exploded perspective view of the sub assemblies of a motor vehicle automatic transmission and of the transmission assembly tool.

Referring now in detail to the drawings, in which like reference numerals indicate like parts throughout the several views, numeral 5 of FIGS. 1, 2A, and 3 illustrate a preferred embodiment of a transmission assembly tool.

Referring now to FIG. 1, tool 5 is adapted for use with a motor vehicle automatic transmission 7. Automatic transmission 7 is comprised of a case assembly 8, having a generally circular opening 9 defined therein and extending downward into the body of the case assembly. In the Ford AXOD or AXODE automatic transmission, typically used in the Ford Taurus and in other front wheel drive Ford automobiles, the diameter of opening 9 in case assembly 8 is approximately eight inches across, and opening 9 extends approximately eleven inches in depth into the case assembly. At the bottom of opening 9 a differential assembly 11 (shown schematically in FIG. 3) is seated, having a differential output shaft 12 extending out of case assembly 8 along longitudinal axis 13.

As best shown in FIG. 3, a lower-intermediate drum and rear sun gear assembly 14 is passed downward along differential output shaft 12 and is positioned on differential assembly 11. Planetary assembly 15 is fit into rear sun gear assembly 14 along differential output shaft 12 within opening 9 of case assembly 8. As best shown in FIGS. 1 and 3, planetary assembly 15 includes a front planet assembly 16, the front planet assembly having a hub 17 extending along longitudinal axis 13, about differential output shaft 12, in which an annular groove 19 is defined below a splined or toothed section formed as a part of the front planet assembly. Thereafter, and as shown in FIGS. 1 and 3, a reverse clutch assembly 21 is fit atop planetary assembly 15 within opening 9 in case assembly 8, and about differential output shaft 12.

In the Ford AXOD or AXODE automatic transmissions differential output shaft 12 has a diameter of approximately one inch. Planetary assembly 15 will have a diameter of approximately 5¾ inches and reverse clutch assembly 21 will have a diameter of approximately 7½ to 7 9/16 inches. The combined weight of planetary assembly 15 and reverse clutch assembly 21 is approximately 25 pounds. Hub 17, extending along longitudinal axis 13 (FIG. 1), has a diameter of approximately 1½ inches, and groove 19 is approximately ¼ inch deep so that the cross section through hub 17, where groove 19 is defined, is approximately one inch in diameter. Lastly, differential output shaft 12 extends approximately one inch out of case assembly 8 when automatic transmission 7 is assembled.

In the Ford Motor Company Manual titled Axod Automatic Overdrive Transaxle-Disassembly And Assembly, Order Number 1701-206, revised Jul. 1986, it is anticipated that automatic transmission 7 will be assembled and disassembled in a generally vertical position while positioned on a workbench or other work surface. However, in practice automatic transmission 7 is typically not removed from the automobile of which the automatic transmission forms a part of the drivetrain, thus necessitating installation of planetary assembly 15 and reverse clutch assembly 21 in a generally horizontal position while the automobile is positioned on a service rack over the head of the mechanic rebuilding the transmission. The fact that planetary assembly 15 reverse and clutch assembly 21 together weigh approximately 25 pounds and that there will be a clearance of no more than 7/32 of an inch to ¼ of an inch on either side of reverse clutch assembly 21 within opening 9 makes clear the difficulties inherent in assembling the components of automatic transmission 7 in an overhead position.

Transmission assembly tool 5, best shown in FIGS. 1 and 2A, provides a solution to the difficulty surrounding the installation of the planetary assembly and reverse clutch assembly in the case assembly of the transmission. Referring now to FIGS. 1 and 2A, transmission assembly tool 5 has an elongated tubular handle 23 extending along a longitudinal axis 13. Handle 23 has a first end 25 and an opposed second end 26. Transmission assembly tool 5 includes a grip assembly 28 formed at first end 25 of handle 23. Grip assembly 28 includes a handle extension 29 extending away from first end 25 of the handle along longitudinal axis 13.

At the end of handle extension 29 opposite first end 25 of handle 23, a pair of spaced fingers 30 are provided and extend from handle extension 29 transversely with respect to longitudinal axis 13. As best shown in FIGS. 1 and 3, and for the alternate preferred embodiment of tool 5 as shown in FIG. 2B, each of fingers 30 is spaced apart from the other and on opposite sides of longitudinal axis 13. Grip assembly 28 of tool 5 has been designed so that fingers 30 will grasp hub 17 of front planet assembly 16 therebetween, each of fingers 30 being sized to fit within groove 19 defined in the hub. This is best shown in FIG. 3, where tool 5 is shown with fingers 30 engaged in groove 19 during the installation of planetary assembly 15 and reverse clutch assembly 21 within case assembly 8. The fingers have been illustrated as being substantially straight. However, it should be understood that the fingers also can be formed in other configurations, i.e., an "S" shape or other curved configurations.

As shown in FIGS. 1 and 3, tool 5 has a generally rectangular or square cross section transverse to longitudinal axis 13. Referring now to FIG. 2A, this embodiment of tool 5 has a top wall 32 and an opposed and generally parallel bottom wall 33. Extending between top wall 32 and bottom wall 33 is a pair of opposed sidewalls 34, although only one sidewall 34 shown in FIG. 2A for the purposes of clarity. Sidewall 34 is connected along its common edges to top wall 32 and bottom wall 33, so that handle 23 is an elongated and generally tubular enclosure having open ends at first end 25 and second end 26.

Due to the dimensions of automatic transmission 7, and its component assemblies, discussed above, it is anticipated that handle 23 will extend lengthwise along axis 13 in the range of from 10 to 25 inches in order to provide sufficient length to insert the planetary assembly and reverse clutch assembly within the case assembly. An interior passageway 38 is formed along longitudinal axis 13 and extends from first end 25 to second end 26 of tool 5 (FIG. 2A) in order to accommodate the passage of differential output shaft 12 therein. It is anticipated that when tool 5 is used to assemble Ford AXOD and AXODE transmissions differential output shaft 12 will extend from first end 25 into handle 23 along axis 13, but will not pass out of second end 26 of the handle.

Handle extension 29 generally extends a distance of approximately 0.878 inches away from first end 25 of handle 23 along axis 13. Each of fingers 30 will have a thickness with respect to its length of approximately 0.270 inches, bearing in mind that groove 19 is approximately ¼ inch or 0.25 inches, in cross section. By making fingers 30 approximately 0.270 inches thick, each of fingers 30 can be forced into groove 19 with a hand pressured press or interference fit, which will ensure that front planet assembly 16, and thus planetary assembly 15, will be held snugly by tool 5, but yet allow the removal of tool 5 from front planet assembly 16 after installation of the planetary and reverse clutch assemblies within the case assembly. Also, and due to the configuration of hub 17, fingers 30 are spaced apart from one another in the range of 0.50 (½) inches to 1.063 (1¹/₁₆) inches from opposed inside edge to inside edge. As shown best in FIGS. 1 and 3, and as discussed above, each of fingers 30 are positioned symmetrically with respect to the other about longitudinal axis 13. Lastly, each of fingers 30 will have a length transverse to axis 13 of approximately ½ inch, and it is anticipated the fingers 30 will extend approximately 1½ inches in length, although modifications in length can be made as desired.

An alternate embodiment of tool 5 is shown in FIG. 2B. Tool 5 as shown in FIGS. 1 and 2A has a generally square or rectangular cross section. Tool 5 as shown in FIG. 2B has a generally circular cross section, with handle 23 being formed by a continuous curvilinear sidewall 36 extending along and about longitudinal axis 13. Handle extension 29 again extends away from first end 25 of handle 23. Here, however, handle extension 29 has a generally arcuate cross section, although it is anticipated handle extension 29 could be a generally planar surface if so desired. As with the tool of FIG. 2A, the tool of FIG. 2B has a pair of spaced fingers 30 of similar size and dimension as disclosed above.

Tool 5 is otherwise conventionally constructed in that there is no special method required for its construction, so long as it has the dimensions and is shaped as disclosed herein. It is anticipated that tool 5 will be manufactured from a metal material, such as aluminum, spring steel, or other durable but flexible materials including light strength plastics and other materials, and could possibly be constructed of one of the modern plastics which provides sufficient structural rigidity but yet provides sufficient flexibility to allow fingers 30 to engage groove 19 and be withdrawn therefrom after planetary assembly 15 and reverse clutch assembly 21 are installed in case assembly 8.

OPERATION

It is known in the art, as disclosed in Ford's AXOD Automatic Overdrive Transaxle-Disassembling And Assembly Manual, referenced above, that automatic transmission 7 will be assembled by installing differential assembly 11

(FIG. 3), having differential output shaft 12 extending therefrom, within opening 9 of case assembly 8. Once the differential assembly is positioned within case assembly 8, lower-intermediate drum and rear sun gear assembly 14 is positioned over differential output shaft 12 and passed along differential output shaft 12 into opening 9 so that it rests on the top of differential assembly 11. This is done by passing lower intermediate drum and rear sun gear assembly 14 into opening 9 by hand, and forcing it along differential output shaft until it rests on top of differential assembly 11.

Thereafter, and as envisioned in the AXOD Disassembly And Assembly Manual, case assembly 8 is oriented in a generally vertical position on a workbench or other sturdy work surface so that planetary assembly 15 can be lowered into opening 9 along differential output shaft 12 by hand. As best shown in FIGS. 1 and 3, planetary assembly 15 will fit on top of and within lower intermediate drum and rear sun gear assembly 14.

Since planetary assembly 15 has a diameter of approximately 5¾ inches, and opening 9 has a diameter of approximately eight inches, this provides a clearance of approximately 1⅛ inches on each side of planetary assembly 15 as it is lowered into opening 9. This can be accomplished by hand when case assembly 8 is positioned vertically due to the fact that assembly of the transmission, occurs within the mechanic's sight when he or she lowers planetary assembly 15 down onto differential output shaft 12, and rotates planetary assembly 15, if need be, to engage the planetary assembly on the spline/hub formed as a part of rear sun gear assembly 14. Thereafter, as known in the art, reverse clutch assembly 21 is lowered by hand into opening 9, along and about differential output shaft 12, so that the reverse clutch assembly rests on top of planetary assembly 15, and more particularly rests on top of front planet assembly 16.

Since reverse clutch assembly 21 has a diameter of approximately 7½ to 7⁹⁄₁₆ inches and opening 9 a diameter of approximately 8 inches, this results in a clearance of only ⁷⁄₃₂ to ¼ inch on each side of the reverse clutch assembly within case assembly 8, and thus it is imperative that the reverse clutch assembly be moved into opening 9 in a position exactly parallel to differential output shaft 12, otherwise reverse clutch assembly 21 will likely become misaligned within opening 9, and will catch against the sides of opening 9 so that it will not be able to fit within case assembly 8.

Although this assembly procedure may otherwise seem straightforward and simple, this assembly procedure is extremely difficult and time consuming when planetary assembly 15 and reverse clutch assembly 21 are being installed in the transmission of an automobile requiring that all of the transmission sub-assemblies be lifted and painstakingly fit into locking position within the tight confines of the case assembly 8 by a mechanic who cannot fully see into opening 9 to determine if planetary assembly 15 and reverse clutch assembly 21 are properly aligned therein during installation. This problem is overcome by using transmission assembly tool 5 in the installation of planetary assembly 15 and reverse clutch assembly 21, as a combined assembly, within automatic transmission 7.

When assembling an automatic transmission with transmission assembly tool 5, lower-intermediate drum and rear sun gear assembly 14 is passed by hand along differential output shaft 12 in conventional fashion so that it rests against differential assembly 11 within the case assembly. Thereafter, fingers 30 of tool 5 are passed into opposite sides of groove 19 defined in hub 17 of front planet assembly 16.

Due to the tolerances described above, fingers 30 will remain snugly engaged in groove 19, but yet are not so snug that the tool cannot be withdrawn once the planetary assembly is installed within case assembly 8.

After fingers 30 have been passed into groove 19 of the front planet assembly, reverse clutch assembly 21 is lowered over planetary assembly 15, and placed in position thereon, reverse clutch assembly 21 being passed along and over tool 5. Thereafter, tool 5 is used to lift both planetary assembly 15 and reverse clutch assembly 21 together, providing sufficient leverage and support to allow a mechanic to lift the combined assemblies weighing approximately 25 pounds, and pass them over and along differential output shaft 12 into opening 9 of case assembly 8. As differential output shaft 12 extends through planetary assembly 15, and more particularly through hub 17, it passes between fingers 30 and into interior passageway 38 of handle 23 as best shown in FIG. 3, until planetary assembly 15 engages rear sun gear 14. Once planetary assembly 15 engages rear sun gear assembly 14, it is anticipated that some degree of rotational movement, albeit slight, will be needed in order to seat planetary assembly 15 onto the splinde of rear sun gear assembly 14. This rotational movement can be done by using tool 5 and by rotating handle 23 about axis 13. Thereafter, once planetary assembly 15 and reverse clutch assembly 21 are seated within case assembly 8, tool 5 is levered so that grip assembly 28 is moved radially away from hub 17, the dimensions of interior passageway 38 and the length of handle extension 29 providing sufficient room for differential output shaft 12 to move within interior passageway 38 to insure that fingers 30 can be levered out of groove 19 in hub 17, and tool 5 withdrawn out of opening 9 along differential output shaft 12.

Tool 5, therefore, greatly simplifies the transmission assembly process with regard to the installation of planetary assembly 15 and reverse clutch assembly 21, while also insuring a precision fit and saving the time required to install these components accurately within automatic transmission 7.

While a preferred embodiment of the invention has been disclosed in the foregoing specification, it is understood by those skilled in the art that variations and modifications thereof can be made without departing from the spirit and scope of the invention, as set forth in the following claims.

I claim:

1. A method for assembling an automatic transmission, the transmission including a case assembly, a differential output shaft, and a planetary assembly and a reverse clutch assembly sized and shaped to fit together and along the differential output shaft within the case assembly, the planetary assembly having a front planet assembly including a hub shaft formed along a longitudinal axis, the hub shaft having an annular groove defined therein along its exterior circumference, comprising the steps of:

a) positioning the reverse clutch assembly on the planetary assembly;

b) gripping the planetary assembly of the transmission with a tool; and c) simultaneously installing both the planetary assembly and the reverse clutch assembly in the case assembly with said tool.

2. The method of claim 1, further comprising the step of passing the differential shaft of the transmission into an interior passageway defined within and along the length of the tool while installing the planetary assembly and the reverse clutch assembly in the case assembly.

3. The method of claim 1, wherein step a) further comprises the step of placing the hub shaft of the front planetary assembly between a pair of spaced and generally parallel fingers formed as part of said tool, and placing said fingers into engagement with the annular groove defined in the hub shaft.

4. The method of claim 1, further comprising the step of using said tool to seat the planetary assembly and the reverse clutch assembly within the case assembly.

5. The method of claim 1, further comprising the steps of disengaging said tool from the annular groove defined in the hub shaft of the front planet assembly, withdrawing the tool from the reverse clutch assembly along the differential output shaft, and then withdrawing the tool from the case assembly.

6. The method of claim 1, further comprising the step of supporting both the planetary assembly and the reverse clutch assembly together on said tool during installation thereof within the case assembly.

* * * * *